United States Patent
Willis

(10) Patent No.: US 7,949,156 B2
(45) Date of Patent: May 24, 2011

(54) BIOMETRIC REMEDIATION OF DATASETS

(75) Inventor: William F. Willis, Laguna Niguel, CA (US)

(73) Assignee: ImageWare Systems, Inc., San Diego, CA (US)

( * ) Notice: Subject to any disclaimer, the term of this patent is extended or adjusted under 35 U.S.C. 154(b) by 904 days.

(21) Appl. No.: 11/563,059

(22) Filed: Nov. 24, 2006

(65) Prior Publication Data
US 2007/0195999 A1    Aug. 23, 2007

Related U.S. Application Data

(60) Provisional application No. 60/739,216, filed on Nov. 23, 2005.

(51) Int. Cl.
*G06K 9/00* (2006.01)
(52) U.S. Cl. ......................... 382/115; 382/116
(58) Field of Classification Search ............. 382/115, 382/116, 118, 124; 340/5.53, 5.83
See application file for complete search history.

(56) References Cited

U.S. PATENT DOCUMENTS

| | | | |
|---|---|---|---|
| 5,457,747 A | 10/1995 | Drexler et al. | |
| 6,208,264 B1 | 3/2001 | Bradney et al. | |
| 6,430,306 B2 * | 8/2002 | Slocum et al. | 382/118 |
| 7,277,891 B2 * | 10/2007 | Howard et al. | 707/707 |
| 2003/0223621 A1 | 12/2003 | Rowe et al. | |
| 2004/0093349 A1 * | 5/2004 | Buinevicius et al. | 707/104.1 |
| 2004/0213437 A1 * | 10/2004 | Howard et al. | 382/115 |

* cited by examiner

*Primary Examiner* — John B Strege
(74) *Attorney, Agent, or Firm* — Kilpatrick Townsend & Stockton LLP

(57) ABSTRACT

A method for analyzing a dataset comprising biographic data and biometric data is disclosed. In one step, a biographic record is read that is normally meant for unique description of an individual. A biometric associated with the biographic record is also read. The biometric is correlated with a plurality of biometrics associated with other biographic records. The uniqueness of the biometric is assessed with respect to the plurality of biometrics, for example, to find duplicate biographic records with biometric matching.

17 Claims, 8 Drawing Sheets

BIOMETRIC REMEDIATION OF DATASETS

This application claims the benefit of and is a non-provisional of co-pending U.S. Provisional Application Ser. No. 60/739,216 filed on Nov. 23, 2005, which is hereby expressly incorporated by reference in its entirety for all purposes.

BACKGROUND

This disclosure relates in general to biographic record processing and, but not by way of limitation, to biographic record processing for datasets with biometric information.

There are datasets with redundant records. Duplicate records can be due to fraud or clerical errors. For example, a dataset with drivers license information could have biographic information on each license holder along with a photograph. Two licenses with different biographic information could have a picture of the same individual due to a clerical problem or fraud.

Other problems are created by individuals posing under multiple identities. A particular individual could have fabricated biographic information in two records that does not correlate or correlates weakly. Manual review of large datasets is unlikely to result in finding these duplicates. Even where photographs are part of the dataset, a human is not likely to notice two similar photos. Obscuring identity with disguises is likely to thwart any manual review.

SUMMARY

In one embodiment, the present disclosure provides a method for analyzing a dataset comprising biographic data and biometric data. In one step, a biographic record is read that is normally meant for unique description of an individual. A biometric associated with the biographic record is also read. The biometric is correlated with a plurality of biometrics associated with other biographic records. The uniqueness of the biometric is assessed with respect to the plurality of biometrics, for example, to find duplicate biographic records with biometric matching.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
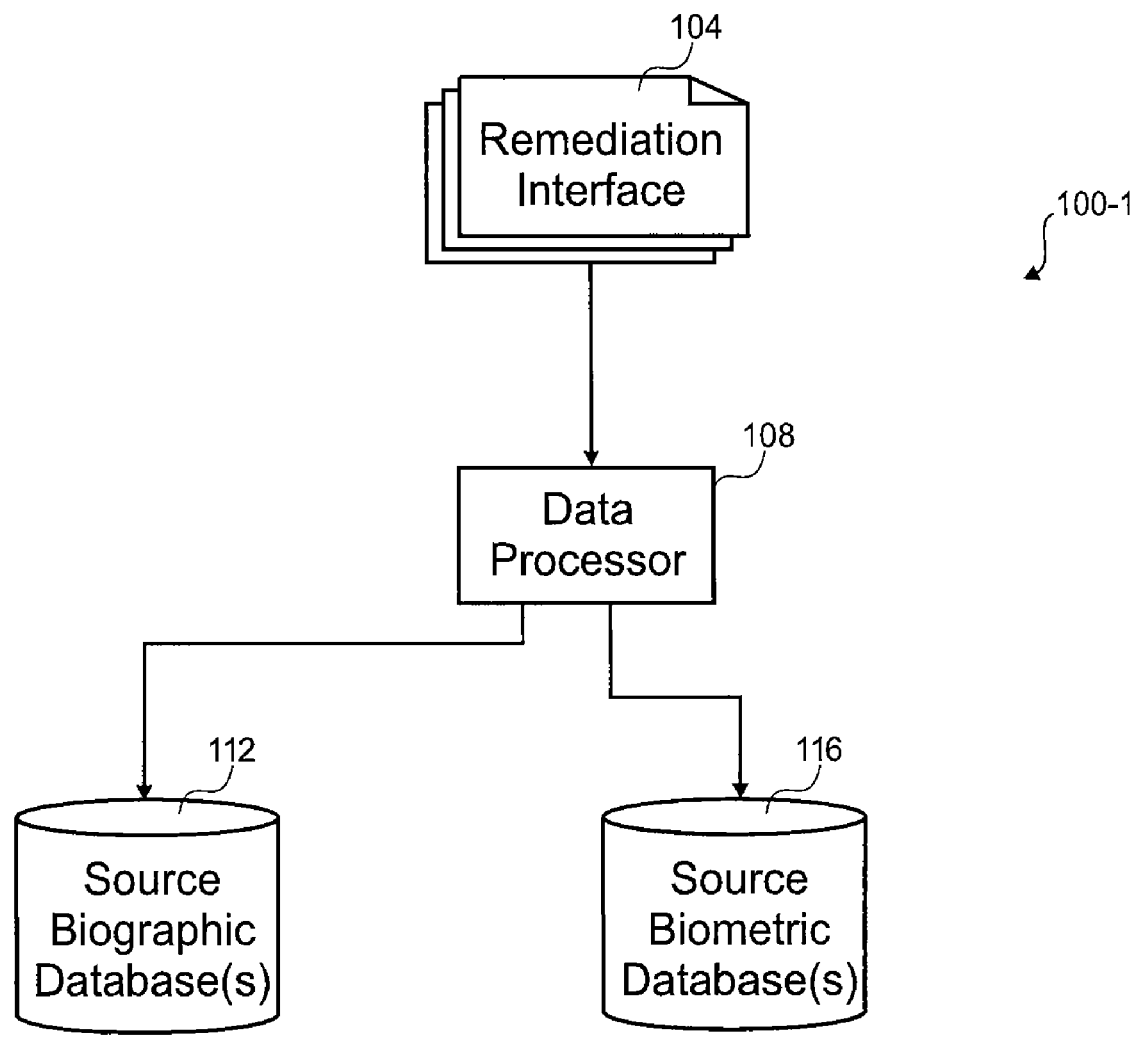
FIGS. 1A, 1B and 1C depict block diagrams of embodiments of a dataset analysis system.

Referring first to FIG. 1A, a block diagram of a dataset analysis system 100-1 is shown. Included in the dataset analysis system 100 is a source biographic database(s) 112, a source biometric database(s) 116, a data processor 108, and a remediation interface 104. Biographic databases 112 often have duplicate records that occur for various reasons such as fraud and/or clerical error. Identification of duplicate or similar records is performed with the dataset analysis system 100.

The source biographic database 112 could be a single database or multiple databases that make up a dataset. The information could include such things as name, address, phone number, e-mail address, identification number(s), date of birth, citizenship, and/or other demographic information. Additionally, there may be application-specific information stored in the source biographic database 112 or elsewhere. For example, a department of motor vehicles (DMV) database could include vehicle infractions, registered vehicles, test dates, license expiration, etc. In another example, an insurance database could include medical history, information on medical care visits, information on relations, etc. An immigration database could have crossing times and declarations from various border crossings.

The source biometric database 116 has something that can be used as a biometric to uniquely identify a person. There could be multiple biometrics of the same or different type associated with each biographic record. The biometrics that might be stored in the source biometric database 116 include 2D face, 3D face, iris, retina, finger vein, palm vein, single fingerprint, fingerprints, scans of the flat of a palm, writers palm, hand geometry, dental records, signature, voice, nuclear DNA, mitochondrial DNA, keystroke, gait, smell, and/or any other biometric that can be digitally analyzed. The source biometric database 116 could be part of the source biographic database 112 or separate in various embodiments.

One biometric of some sort or more is available for a particular biographic record. For example, a DMV database might have a picture and/or a signature corresponding to each record. By analyzing a biometric associated with a record, the dataset analysis system 100 can determine how unique the biometric is likely to be with respect to other biometrics for other records. In some cases, matching biometrics are expected, but in other situations, a match is unexpected. For example, a signature on successive forms signed by the same person are expected to match, but iris scans on unrelated records are not expected to match.

The data processor 108 is a computer or group of computers that can process the database 112, 116 information and interact with users. Computer equipment of the data processor 108 stores the databases 112, 116 and allows processing queries. The data processor 108 may be local to or remote from the remediation interface 104 and databases 112, 116.

Any pre-processing of queries, matching of biometrics and biographic records, flagging of possible issues is performed by data processor 108.

The remediation interface 104 allows users to interact with the databases 112, 116 through the data processor 108. The remediation interface 104 may be an application interface or a web interface in various embodiments. Queries of the databases 112, 116 and resolving any issues can be performed by an operator interacting through the remediation interface 104.

Figure 1B:
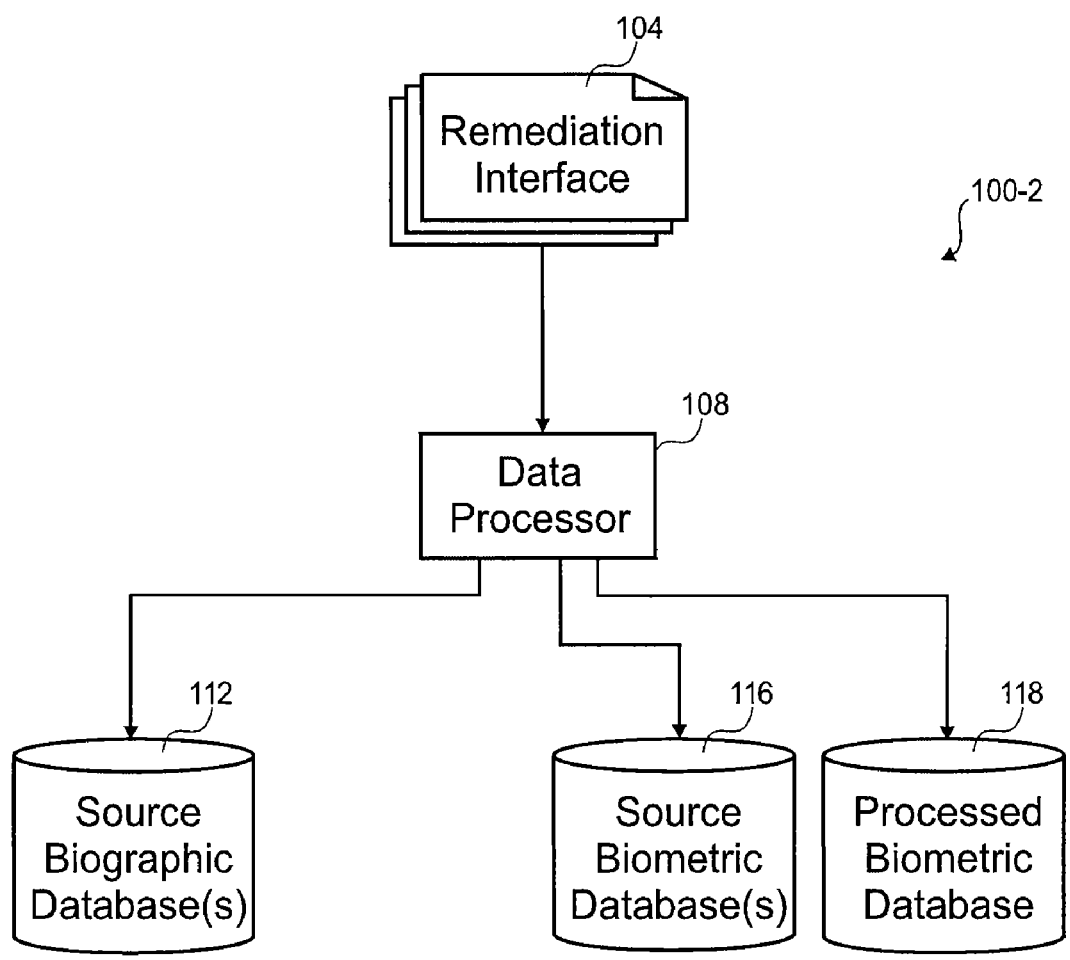

With reference to FIG. 1B, a block diagram of another embodiment of the dataset analysis system 100-2 is shown. This embodiment includes additional information in a processed biometric database 118. The source biometric database 116 may have biometrics with flaws that would use additional processing during the matching process. For example, photographs may not have the faces centered, the photo background may not be uniform or other issues that make processing more time intensive. Features used by the biometric algorithm can identified in the processed biometric database 118, for example, the facial features could be identified beforehand. The enhanced biometrics are stored in the processed biometric database 118. The processing can be done before the matching process or as part of the process in various embodiments.

Figure 1C:
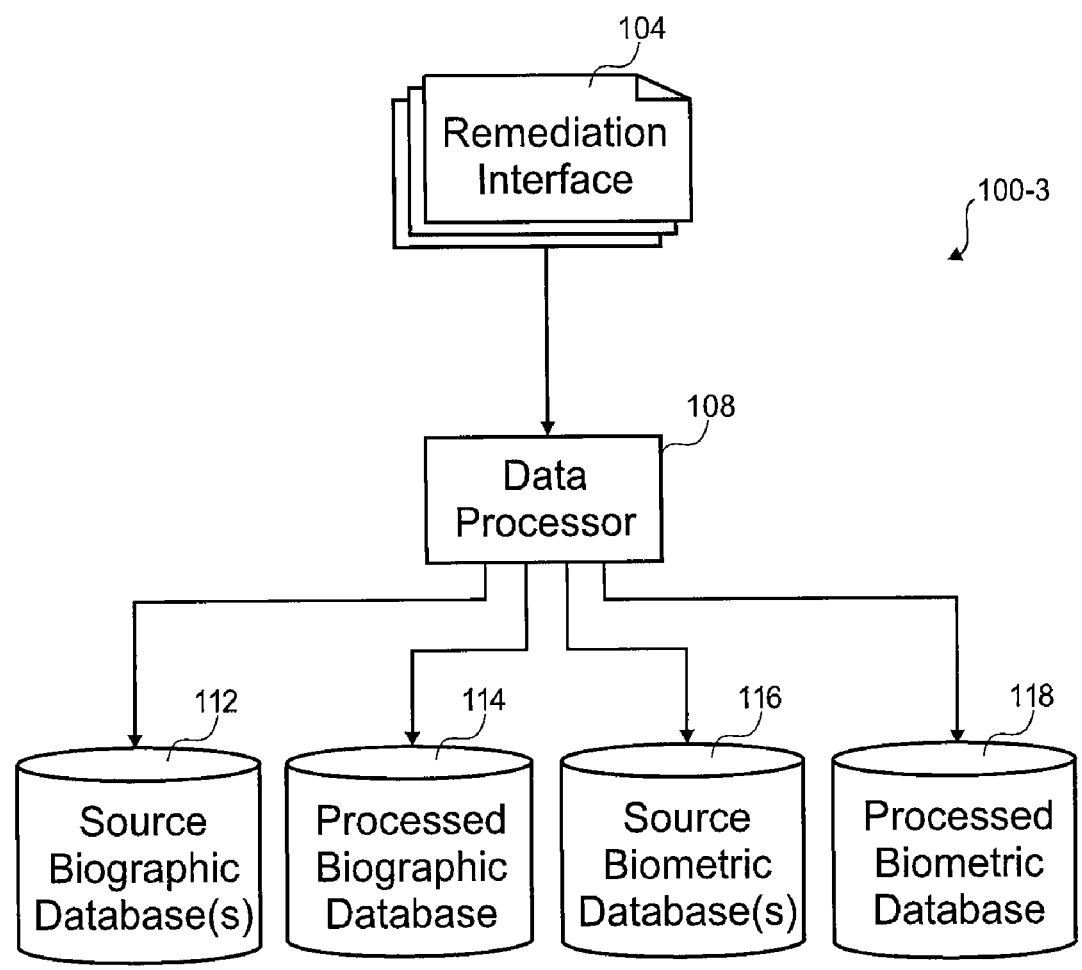

Referring next to FIG. 1C, a block diagram of yet another embodiment of a dataset analysis system 100-3 is shown. This embodiment includes a processed biographic database 114. The information in the source biographic database 112 can have certain inconsistencies in data gathering. For example, there could be small mistakes in addresses, spelling, etc. Addresses can be corrected by using an off-the-shelf database that checks addresses. Abbreviations and data entry inconsistencies can be fixed also. Phone numbers, for example, may have spaces, dashes or periods for gaps in the number or no gaps at all. All the phone numbers in the source biographic database 112 can be pre-processed before loading the records in the processed biographic database 114 to ease matching. Other embodiments could perform this processing during the matching process.

Figure 2A:
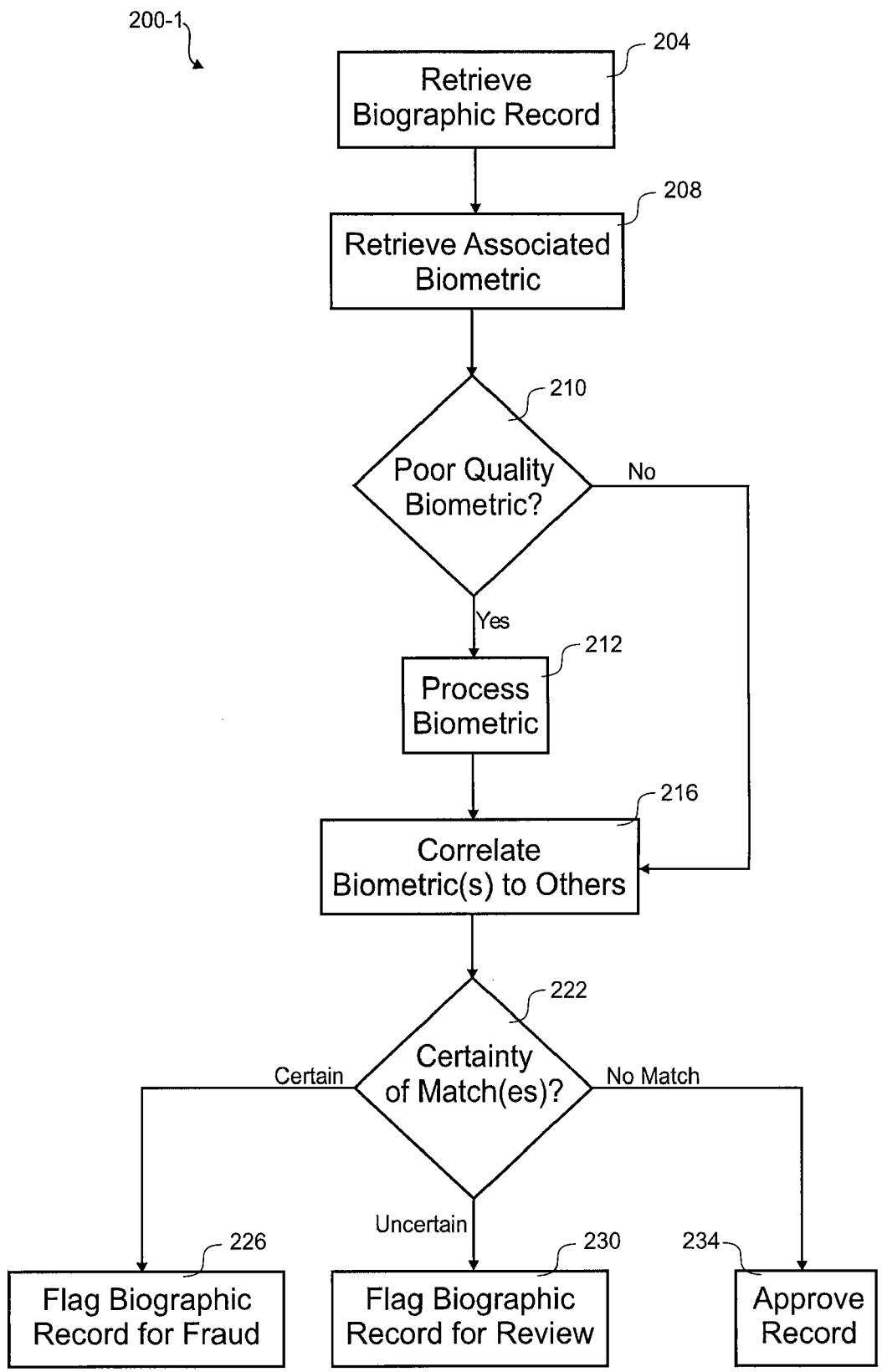
FIGS. 2A, 2B and 2C illustrate flowcharts of embodiments of a process for analyzing a biographic record using a biometric.

Referring next to FIG. 2A, an embodiment of a process 200-1 of analyzing a biographic record using a biometric is shown. This process can be run in succession for each biographic record in the biographic database 112. This embodiment processes the biometrics and moves them from the source biometric database 116 to the processed biometric database 118 during the matching process. Once processed, further processing is typically unnecessary.

The depicted portion of the process begins in block 204 where a biographic record is retrieved from a database 114, 118. An associated biometric is retrieved from the same or a different database 116 in block 208. This embodiment does not pre-process biometrics, but does the processing as part of the matching process. The on-the-fly processing could be saved by populating the processed biometric database 118 to avoid the same processing from being done on subsequent match processes. A determination is made in block 210 to see if the biometric read from the source biometric database 116 can benefit from some processing. Where there could be some benefit, processing is performed in block 212 before proceeding to block 216. Should the determination conclude that the biometric would not benefit from processing, the flow goes from block 210 to block 216 by skipping block 212.

Some processing is typically performed in block 212. For example, a picture of a face may be analyzed to correct for an off-center photo, lighting conditions, angle of head, etc. to aid in matching to other photos. The process of correlating the biometric to others associated with other records is performed in block 216. A given biographic record may have multiple biometrics of the same type, for example, several pictures. Each redundant biometric could be tested or only one from the set.

Matching can be a two-step process where the subject biometric is compared to all others stored to produce scores from each comparison. The scores are tested against thresholds or ranges. The matching process in this embodiment provides levels of certainty in the matching process according to block 222. Where the match is relatively certain, processing continues to block 226 where the record is marked as potentially fraudulent as in this example, the person associated with each record should be unique. Should the match be possible, but not certain processing goes from block 222 to block 230 where the record is flagged for further review and/or investigation in a manual and/or automated manner. Where there is no match possible or likely, the record is approved in block 234.

Upon completion of the process, all the biometrics are compared with the one of the biographic record and each comparison is scored and sorted into the three categories. Should all the scores fall into the "no match" category, the record can be approved as being non-duplicative. Certain matches and likely matches can be followed-up in blocks 226 and 230. This process of approving records can be done as they are added to a dataset or in a audit process that analyzes all records at one time.

Where matches are expected, those results could be taken into account in the analysis. For example, an insurer may have a series of signatures on various declarations. Some are signed by a particular individual, while others are not. Matches are expected that correspond with the predetermined correlations discernable from the biographic information. Where a match is expected, but the score of the biometric does not back that presumption, a further review could be triggered. A hypothesis for each comparison can be validated, invalidated or found unlikely by use of the biometric analysis.

Figure 2B:
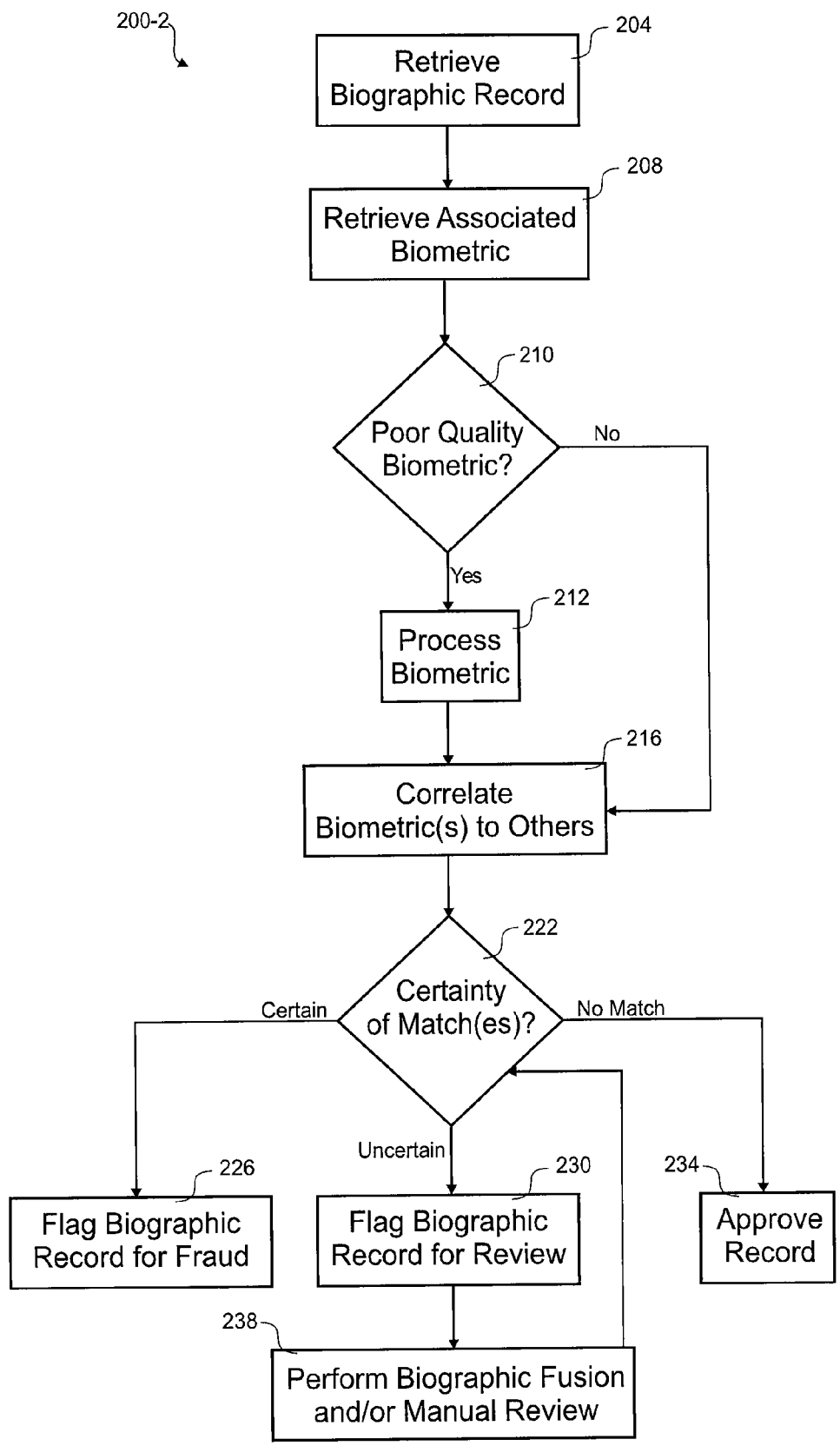

With reference to FIG. 2B, another embodiment of a process 200-2 of analyzing a biographic record using a biometric is shown. This embodiment adds new block 238 performed after block 230. When a record is flagged because the biometric may match for two records, a further comparison of the biographic information could be compared in block 238. Should the biographic information match to some extent in an automatic, it may be presumed that the record is a duplicate and put into a category of a certain match by looping back to block 222 and then to block 226. For example, the biometric match may be uncertain, but the address and name in the biographic record may have only insubstantial differences. Some embodiments could score the biometric match and the biographic match to more precisely discern patterns in the dataset.

Figure 2C:
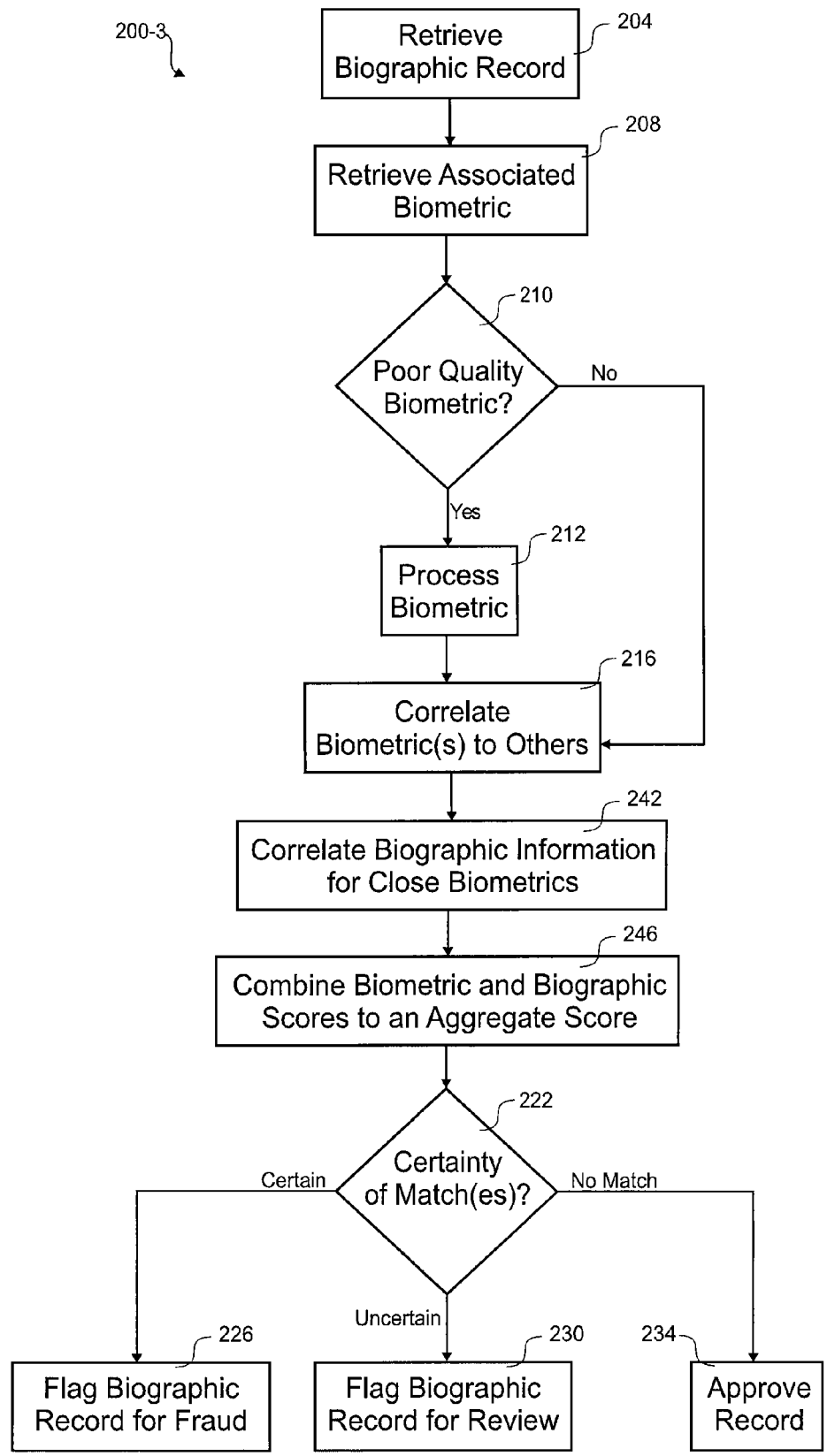

Referring next to FIG. 2C, yet another embodiment of a process 200-3 of analyzing a biographic record using a biometric is shown. This embodiment differs from the embodiment of FIG. 2A in that new blocks 242 and 246 are placed between blocks 216 and 222. For biometrics that score as possible or likely matches, this embodiment performs a correlation analysis of the biographic information in block 242. Other embodiments could perform the analysis on all biographic records. The different fields of biographic information may be weighted in determining the score, for example, hair and eye color could be given greater weight than address. In block 246, the scores from the biographic and biometric analysis is combined into an aggregate score with possible weighting to weigh the two types of scores differently. The aggregate score is used in block 222 to determine how to sort each result.

Figure 3A:
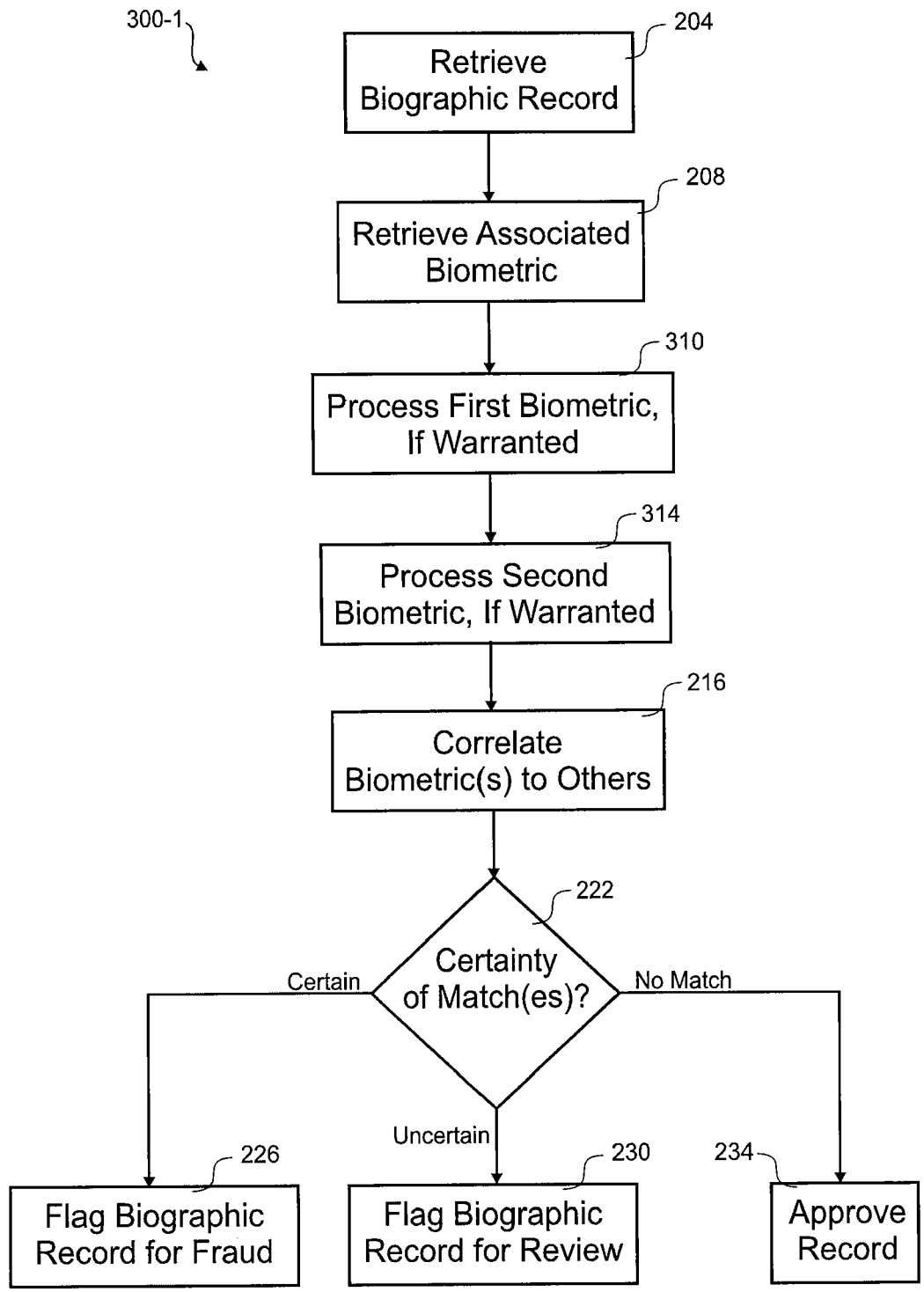
FIGS. 3A and 3B illustrate flowcharts of embodiments of a process for analyzing a biographic record using a number of biometrics.

Referring next to FIG. 3A, an embodiment of a process 300-1 of analyzing a biographic record using a number of biometrics is shown. This embodiment has more than one biometric available for some biographic records. The multiple biometrics could be of the same type or different. As described in U.S. Provisional Patent Application No. 60/663,310, filed on Mar. 17, 2005 and published U.S. patent application Ser. No. 11/378,015 filed on Mar. 17, 2006 (which are both hereby incorporated by reference for all purposes), scoring of matches can incorporate multiple biometrics to increase the accuracy of such matching. In blocks 310 and 314, two biometrics are found and processed for a particular biographic record.

This embodiment can optionally perform the processing as it may not be warranted for some biometrics. Both of those biometrics are correlated in block 216 with others in the dataset to increase the likelihood of finding matching biometrics. For example, a drivers license biographic record could have a signature and a picture. The signature in question would be compared to all others in the dataset, and the picture in question would be compared to all others in the dataset. The two scores in this analysis determined for each two records would be combined in some manner. One embodiment normalizes each score for each type of biometric onto a common scale. The normalized scores are combined with some possible weighting to find an aggregate score. Other embodiments could have any number of biometrics associated with a particular record to further increase accuracy of the aggregate score.

Figure 3B:
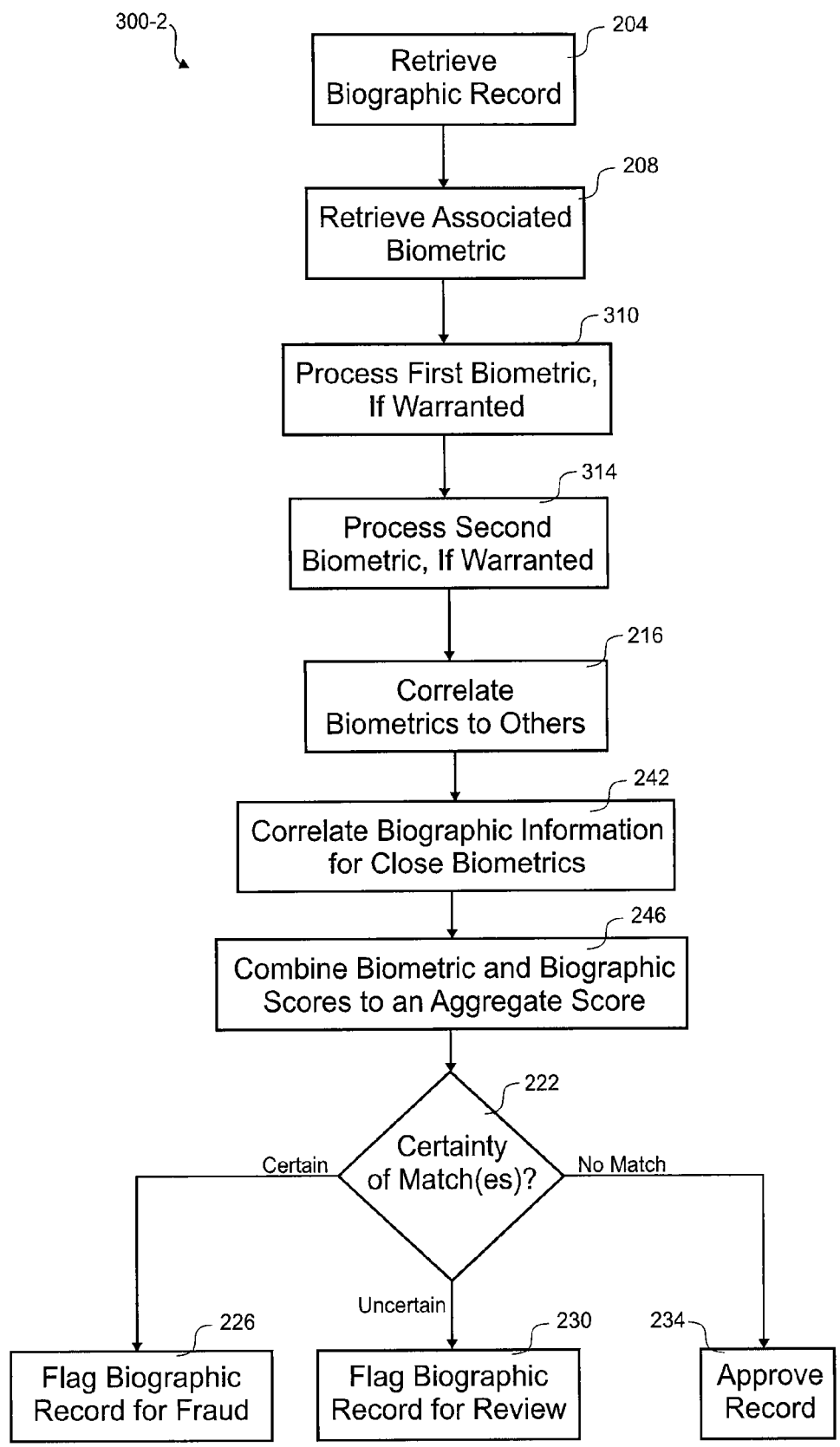

With reference to FIG. 3B, another embodiment of a process 300-2 of analyzing a biographic record using a number of biometrics is shown. This embodiment adds blocks 242 and 248 after block 216. A biographic match score is combined with the aggregate biometric score. In this way, multiple biometrics along with biographic information are used to determine matches.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for analyzing a dataset comprising biographic data and biometric data, the method comprising:
   reading a first biographic record from a first dataset comprising a plurality of biographic records including the first biographic record, wherein each biographic record of the first dataset includes non-biometric data normally meant for unique description of an individual;
   using the non-biometric data to determine a first biometric associated with the first biographic record;
   reading from a second dataset, the first biometric associated with the first biographic record;

reading from the second dataset, a plurality of biometrics associated with other biographic records, the other biographic records meant to be descriptions of individuals different than a first individual associated with the first biometric;

correlating the first biometric with the plurality of biometrics associated with the other biographic records to determine a plurality of biometric scores;

correlating the first biographic record with a plurality of the other biographic records associated with the plurality of biometrics to determine a plurality of biographic scores;

determining a plurality of aggregate scores for associated biometrics and biographic records by combining respective ones of the biometric scores with respective ones of the biographic scores; and assessing uniqueness of the first biographic record based, at least in part, on the aggregate scores.

2. The method for analyzing the dataset comprising biographic data and biometric data as recited in claim 1, wherein the correlating and assessing steps are performed automatically.

3. The method for analyzing the dataset comprising biographic data and biometric data as recited in claim 1, further comprising:

determining if the first biometric and the associated first biographic record matches a second biometric and associated second biographic record.

4. The method for analyzing the dataset comprising biographic data and biometric data as recited in claim 1, further comprising a step of categorizing the first biographic record as probably unique, probably not unique or uniqueness indeterminate.

5. The method for analyzing the dataset comprising biographic data and biometric data as recited in claim 1, wherein the first biometric is a composite biometric formed from at least two separate biometrics.

6. The method for analyzing the dataset comprising biographic data and biometric data as recited in claim 1, further comprising steps of:

determining that the first biometric warrants processing; and processing the first biometric based, at least in part, on the determining step, wherein the first biometric is processed before the correlating and assessing steps.

7. A non-transitory computer-readable medium having computer-executable instructions for performing the computer-implementable method for analyzing the dataset comprising biographic data and biometric data of claim 1.

8. A computer configured to perform the machine-implementable method for analyzing the dataset comprising biographic data and biometric data of claim 1.

9. A method for analyzing a dataset comprising biographic data and biometric data, the method comprising:

retrieving, from a dataset, a plurality of biometrics and a plurality of biographic records, wherein:

each of the plurality of biographic records includes non-biometric data meant to be uniquely associated with one individual;

each of the plurality of biometrics is associated with one of the plurality of biographic records, the plurality of biometrics comprises a first biometric and a second biometric, the plurality of biographic records comprises a first biographic record and a second biographic record, the first biometric is associated with the first biographic record, and the second biometric is associated with the second biographic record;

reading the first biographic record from the dataset;

using the non-biometric data of the first biographic record to determine the first biometric;

reading the first biometric from the dataset;

reading the second biographic record from the dataset;

using the non-biometric data of the second biographic record to determine the second biometric;

reading the second biometric from the dataset;

determining a biometric score representing a level of correlation between the first biometric and the second biometric;

correlating the first biographic record with the second biographic record to determine a biographic score;

determining an aggregate score by combining the biometric score with the biographic score; and assessing uniqueness of the first biographic record based, at least in part, on the aggregate score.

10. The method for analyzing the dataset comprising biographic data and biometric data as recited in claim 9, further comprising:

determining other biometric scores representing a level of correlation between the first biometric and other biometrics in the plurality of biometrics, the other biometrics being different than the first and second biometrics; and assessing uniqueness of the first biometric with respect to the other biometrics in the plurality of biometrics based on the other biometric scores.

11. The method for analyzing the dataset comprising biographic data and biometric data as recited in claim 9, further comprising a step of categorizing the first biographic record as probably unique, probably not unique or uniqueness indeterminate.

12. The method for analyzing the dataset comprising biographic data and biometric data as recited in claim 9, wherein the first biometric is a composite of two biometrics associated with the first biographic record.

13. The method for analyzing the dataset comprising biographic data and biometric data as recited in claim 9, further comprising steps of:

determining that the first biometric warrants processing; and processing the first biometric based, at least in part, on the determining step, wherein the first biometric is processed before the assessing step.

14. A non-transitory computer-readable medium having computer-executable instructions for performing the computer-implementable method for analyzing the dataset comprising biographic data and biometric data of claim 9.

15. A computer configured to perform the machine-implementable method for analyzing the dataset comprising biographic data and biometric data of claim 9.

16. A method for analyzing a dataset comprising biographic data and biometric data, the method comprising:

retrieving, from a dataset, a plurality of biometrics and a plurality of biographic records, wherein:

each of the plurality of biographic records includes non-biometric data meant to be uniquely associated with one individual;

each of the plurality of biometrics is associated with one of the plurality of biographic records, the plurality of biometrics comprises a first biometric and a second biometric, the plurality of biographic records comprises a first biographic record and a second biographic record, the first biometric is associated with the first biographic record, and the second biometric is associated with the second biographic record;

reading the first biographic record from the dataset;

using the non-biometric data of the first biographic record to determine the first biometric;

reading the first biometric from the dataset;

determining that the first biometric warrants processing; and processing the first biometric based, at least in part, on the determining step, wherein the first biometric is processed before the assessing step;

reading the second biographic record from the dataset;

using the non-biometric data of the second biographic record to determine the second biometric;

reading the second biometric from the dataset;

determining a biometric score representing a level of correlation between the first biometric and the second biometric;

correlating the first biographic record with the second biographic record to determine a biographic score;

determining an aggregate score by combining the biometric score with the biographic score;

assessing uniqueness of the first biographic record based, at least in part, on the aggregate score; and categorizing the first biographic record as probably unique, probably not unique or uniqueness indeterminate.

17. The method for analyzing the dataset comprising biographic data and biometric data as recited in claim 16, wherein the first biometric is a composite of two biometrics associated with the first biographic record.

\* \* \* \* \*